Sept. 4, 1962 M. WALLSHEIN 3,052,029
AUTOMATIC TEETH SEPARATORS
Filed Oct. 19, 1959
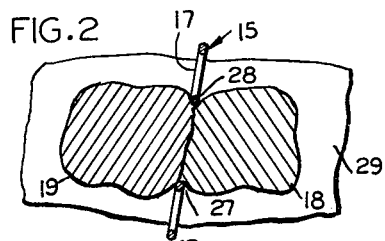
FIG.2
FIG.1
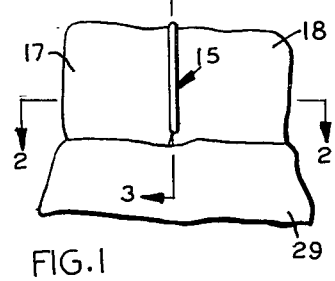
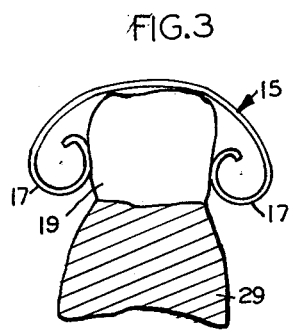
FIG.3
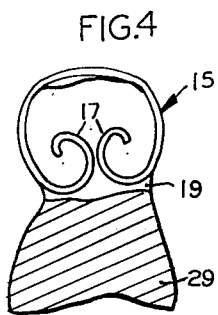
FIG.4
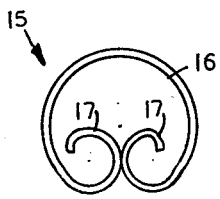
FIG.5
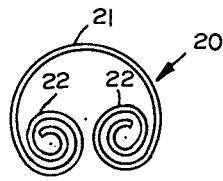
FIG.6
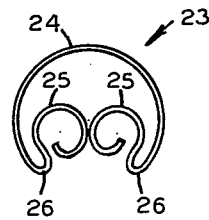
FIG.7
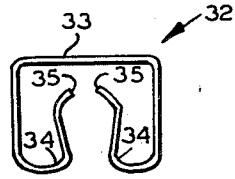
FIG.8
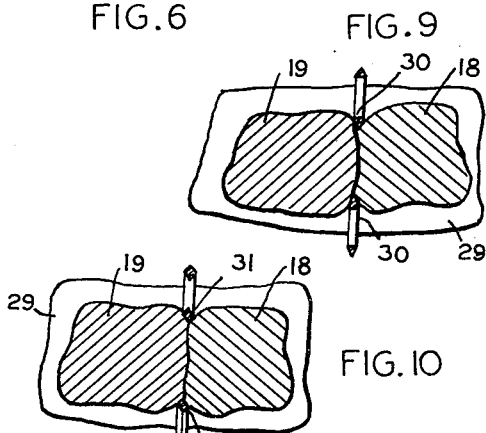
FIG.9
FIG.10
*INVENTOR,*
MELVIN WALLSHEIN,
BY
ATTORNEY.

United States Patent Office 3,052,029
Patented Sept. 4, 1962

3,052,029
AUTOMATIC TEETH SEPARATORS
Melvin Wallshein, 8645 Bay Parkway, Brooklyn, N.Y.
Filed Oct. 19, 1959, Ser. No. 847,170
12 Claims. (Cl. 32—14)

The present invention relates to teeth separators for use in orthodontic and other dental procedures.

An object of this invention is to provide novel and improved teeth separators having spring-powered elements which automatically work themselves in between the selected teeth and even though they remain in the mouth for a period of days to accomplish separation, there is a minimum of interference with occlusion.

Another object thereof is to provide novel and improved teeth separators of the character mentioned, which are simple and cheap to manufacture, easy to apply and remove and efficient in carrying out the purpose for which they are designed.

Other objects and advantages will become apparent as this disclosure proceeds.

In the preferred practice of this invention, the separators are made of strong, springy, relatively thin wire, made to form a main U-shape whose distal end portions are each preferably formed into resilient formations within and coplanar with the main U-form. These elements act independently and co-operatively whereby said formations work their way into between the teeth; the separator being so mounted that the main U-form straddles the teeth and whereby said inner formations press on the teeth along or nearly along their contact line. If desired, said formations may be non-resilient, whereby the main U-part alone furnishes the working force.

When the patient's upper and lower teeth are in occlusion, the crest of the main U-form may become deformed to conform to teeth surface contour, but the bite is not appreciably interfered with and such deformation does not hinder the independent action of the inner formations of the separator which are made to enter between the teeth selected. To accomplish its work, the separator is left in the mouth for a sufficient period.

In the accompanying drawing forming part of this specification, similar characters of reference indicate corresponding parts in all the views.

FIG. 1 shows two contacting teeth as viewed from the buccal side of a mouth, equipped with one form of separator embodying the teachings of this invention.

FIG. 2 is a section taken at line 2—2 in FIG. 1.

FIG. 3 is a section taken at line 3—3 in FIG. 1.

FIG. 4 is like FIG. 3, but here the separator has worked its way between the teeth, thus causing their separation.

FIG. 5 is a front view of the separator shown in FIG. 1.

FIGS. 6, 7 and 8 show separators of modified constructions in accordance with this invention.

FIGS. 9 and 10 are views like FIG. 2. In FIG. 2, the wire stock used for the separator is of round cross-section. In FIG. 9, the wire stock is of triangular cross-section while in FIG. 10, the wire stock used for the separator is of square cross-section.

In the drawings, the numeral 15 designates generally a teeth separator made of springy, round, strong, relatively thin wire, which is bent to comprise a main U-form 16; the end regions of each arm of which being bent into a compressible formation which is between the arms of said main U-form and coplanar therewith. Here, said inner forms, each comprise nearly a turn 17. For a modified construction, as for example shown at 20, the main U-form 21 may have the compressible spiral inner forms 22 associated integral therewith, and for another modification in structure shown at 23, the main U-form 24 may terminate in the inner ?-shaped forms 25, joined at 26 as shown. In the separator 15, the turns 17 are in opposite direction. In the separator 20, the spirals are in opposite directions in their winding, and in the separator 23, the ?-forms are one right and one left. Preferably, all the components of the article 15 are coplaner. The same preferred condition exists in the items 20 and 23 respectively.

When any two contacting teeth are to be separated, as for instance those designated by the numerals 18 and 19, any one of the separators shown is set so that its main U-form straddles them and the proximate elements of their inner forms are set, one along the lingual contact line of said teeth and the other along the buccal contact line of such teeth and let stay there for a few days. This manner of mounting will open and stress the main U-form thereof, and also will compress and stress the inner forms of the separator. The action of the main U-form to close and the action of each of its associated inner spring forms to open, will cause said inner forms to enter in between said teeth 18, 19 and separate them.

It is to be noted that the closing action of the main U-form brings the inner spring forms towards each other and that the individual opening actions of each of said inner forms brings said inner forms towards each other, all thus participating in forcing the teeth apart a distance at least equal to the thickness of the wire stock the separator is made of. When the separator is removed after its interval of automatic work, the teeth remain in their separated positions.

While one of these separators is mounted in the mouth as mentioned, whenever the patient bites, the crest of the main U-form will be pressed down and will soon conform to the contour of the teeth's biting surfaces and occlusion will be hardly interfered with. It is evident that for the patient to eat, there will be no molestation.

It should also be noted, that the mounting of the separator is facilitated by the dihedral angles 27, 28 usually existing at the contact of two teeth. Also, there is hardly the occurrence that the separator will ever touch the gum 29. The operation of these separators is painless.

Although not shown, it is readily understood by those versed in the mechanical arts, that when these separators are flat, they may be marketed in the form of a clip of staples held in assembly by a usual glue which permits their easy severance, and may even be applied in the mouth by a tacker of the kind which uses staples, whose loading bar is formed to suit the reception of a clip of these separators as if they were staples. No claim being made for the staple-like assembly and their application by tacker, no illustration thereof is included herein. Of course, I am referring only to the known forms of staple clip and tacker.

In the separator 32 shown in FIG. 8, the main U-part 33 is a flat bottom U-shape which may be adopted for any of the separators illustrated herein, and the inner stressable formations 34 make U-forms with said main U-part 33 and their ends are bent as at 35 to first press against the lingual and buccal sides of the perimeter line of the contact area of the teeth.

Although it is practical to use round wire for these separators as seen specifically in FIG. 2, they may be of wire whose cross section is triangular as at 30, or square as shown at 31. In each such latter instance, the inner spring forms of the separators should be so made that they are entered into the dihedral angles 27, 28, so that they nest therein with an apex line edge of the wire in contact with the contact line of the teeth. Such conditions are indicated respectively in the FIGS. 9 and 10. The wire being of rather small cross-sectional area, this advantage can hardly be attained by the use of wires of other polygonal cross-sections, though their use is within the preview of this invention.

When two successive teeth are in contact, then substantially the entire areas of their adjacent surfaces may be in contact, or just parts thereof. The common perimeter line of the contacting areas may be part along occusal side, part along buccal side, part along lingual side and part along gingival side, or only along some of them and mere point contact along the others. It is evident that it is on this common perimeter line that the spring wire formations extending from the main U-part of the fitting, bear against. These spring wire formations, when of round wire, may be deemed also to press against such common perimeter line, and are so intended to be covered by the following claims, though geometrically they would press the teeth minute distances aside of such common perimeter line. It may also be noted that two successive teeth which are to be separated, are already separated a minute distance in some instances. For the purpose of these claims, such minute void shall be deemed as if it did not exist, and the perimeter line of such void shall be deemed a perimeter line common to the adjacent surfaces of said teeth. Regardless of the tooth structure existing, the separator taught herein when applied thereto, will work its way in between the teeth to accomplish the intended separation and of course, the parts of the separator should be so dimensioned to be properly accommodated on the teeth worked on.

This invention is capable of numerous forms without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific description of the several embodiments illustrated herein, to indicate the scope of this invention.

I claim:

1. A fitting for separating two adjacent teeth in a mouth, comprising a main U-part of springy material adapted to be set in a mouth so that one arm of said U-part is at the buccal side and its other arm is at the lingual side of said teeth when the arms of said U-part are spread apart whereby said U-part is stressed; said U-part when so mounted, permitting occlusion by the wearer and a springy formation extending from one of said arms towards the second arm; said formation being independently stressed and adapted to press against the common perimeter line of the adjacent surfaces of said teeth when the fitting is mounted on the teeth, whereby said formation is forced to enter between said teeth by the closing action of said main U-part and by the tendency of said formation to approach the other arm of said U-part independent of the closing of said U-part.

2. A fitting as defined in claim 1, wherein the formation mentioned, is compressed and expandable when the fitting is mounted on the teeth.

3. A fitting as defined in claim 1, wherein the second arm has a springy formation extending therefrom towards the first arm, which last mentioned springy formation is independently stressed and adapted to press against the common perimeter line of the adjacent surfaces of said teeth when the fitting is mounted on the teeth.

4. A fitting as defined in claim 3, wherein each of said formations with that part of the arm of the main U-part it extends from, together comprise a U-shape.

5. A fitting as defined in claim 3, wherein each of said formations is spiral-shaped.

6. A fitting as defined in claim 3, wherein each formation is a U-shape extending in the same direction as the direction of the main U-part.

7. A fitting as defined in claim 3, wherein each formation is substantially ?-shaped.

8. A fitting as defined in claim 3, wherein the main U-part is a substantially flat-bottom U-shape.

9. A fitting as defined in claim 3, wherein each of said formation is of wire of triangular cross-section; an apex line of said wire of said formation being against the line of contact of the teeth when the fitting is mounted thereon.

10. A fitting as defined in claim 3, wherein each of said formations is of wire of square cross-section; an apex line of said wire of each formation being against the line of contact of the teeth when the fitting is mounted thereon.

11. A fitting as defined in claim 3, wherein each of said formations is of wire and has a free end which extends in a direction to enter between the teeth when the fitting is applied to the teeth.

12. A fitting as defined in claim 4, wherein each of said U-shapes extending from the respective arms of the main U-part, is part of a turn.

References Cited in the file of this patent
UNITED STATES PATENTS

| | | |
|---|---|---|
| 2,056,215 | Smith | Oct. 6, 1936 |
| 2,484,449 | Fetterman | Oct. 11, 1949 |
| 2,897,598 | Kesling | Aug. 4, 1959 |